United States Patent
Leung et al.

(10) Patent No.: US 11,684,042 B1
(45) Date of Patent: Jun. 27, 2023

(54) ANIMAL COLLAR

(71) Applicant: Launch Lab, Inc., Pasadena, CA (US)

(72) Inventors: Michael Leung, Pomona, CA (US); Ruixi Chen, Temple City, CA (US)

( * ) Notice: Subject to any disclaimer, the term of this patent is extended or adjusted under 35 U.S.C. 154(b) by 232 days.

(21) Appl. No.: 16/945,956

(22) Filed: Aug. 3, 2020

(51) Int. Cl.
*A01K 27/00* (2006.01)
*A44B 11/00* (2006.01)
*A01K 15/00* (2006.01)

(52) U.S. Cl.
CPC ............ *A01K 27/001* (2013.01); *A01K 15/00* (2013.01); *A01K 27/002* (2013.01); *A44B 11/008* (2013.01)

(58) Field of Classification Search
CPC ...... A01K 27/001; A01K 15/00; A01K 2/001; A01K 27/002; A44B 11/008
See application file for complete search history.

(56) References Cited

U.S. PATENT DOCUMENTS

| | | | | |
|---|---|---|---|---|
| 188,043 | A * | 3/1877 | Elmore | A01K 27/001 119/864 |
| 4,811,695 | A * | 3/1989 | Higgins | A01K 27/001 119/863 |
| 7,243,615 | B1 * | 7/2007 | Hendrie | A01K 27/001 119/792 |
| 9,271,476 | B1 * | 3/2016 | Flynn | A01K 27/002 |
| 2002/0092138 | A1 * | 7/2002 | Spiller | A01K 27/002 24/306 |
| 2006/0032463 | A1 * | 2/2006 | Pettersson | A01K 27/006 119/856 |
| 2007/0006823 | A1 * | 1/2007 | Sandberg | A01K 27/008 119/856 |
| 2013/0269628 | A1 * | 10/2013 | Holt, Jr. | A01K 27/001 119/792 |
| 2016/0286763 | A1 * | 10/2016 | Durrant | A01K 27/001 |
| 2017/0251640 | A1 * | 9/2017 | Eastman | A01K 27/005 |
| 2017/0290302 | A1 * | 10/2017 | Waters | A01K 27/005 |
| 2017/0295754 | A1 * | 10/2017 | Hiers | A01K 27/001 |
| 2018/0199547 | A1 * | 7/2018 | Moore | A01K 27/003 |
| 2019/0246607 | A1 * | 8/2019 | Chen | A01K 27/001 |
| 2019/0320618 | A1 * | 10/2019 | Simons | A01K 27/005 |
| 2019/0343084 | A1 * | 11/2019 | Mason | A01K 27/003 |
| 2019/0343086 | A1 * | 11/2019 | Miller | A01K 27/001 |
| 2019/0364849 | A1 * | 12/2019 | Falkenberg | A01K 27/001 |
| 2020/0093097 | A1 * | 3/2020 | Robinson | A01K 15/02 |
| 2021/0105975 | A1 * | 4/2021 | Amr | A01K 15/02 |

* cited by examiner

*Primary Examiner* — Timothy D Collins
*Assistant Examiner* — Madeline L Douglas
(74) *Attorney, Agent, or Firm* — David J. Wilson (57) ABSTRACT

The present invention is to a collar for animals that can be converted on-the-fly for use in both training purposes by providing cinching around the animal's neck and for non-training purposes wherein the cinching is reduced or prevented.

12 Claims, 9 Drawing Sheets

ANIMAL COLLAR

BACKGROUND

When animals such as dogs are taken for a walk by their owners or human companions they are typically kept safe from vehicular traffic and other dangers by being lead on a lead (also referred to interchangeably as a lease both in the art and herein). The lead is commonly attached to a collar that is placed around the animal's neck. Two types of collars are generally available. One type attaches to the animal's neck and is adjusted by a buckle mechanism similar to the buckles used on belts. Once put on an animal the collar length is fixed until the collar is removed and adjusted. The other type of collar allows the collar length to vary as it is worn by the animal. As the animal pulls or the lead is pulled the collar tightens evenly on the animal's neck causing discomfort without causing injury. These collars are frequently used, for example, in training an animal to not pull on a lead and other desired behaviors.

The problem with the first type of collar is that it is generally less effective in training since any pressure generated by the collar is only localized to the front of the animal's neck potentially causing excessive discomfort or injury. The problem with the second type of collar is that when the animal is not on a lead, the loose end of the collar where the lead is attached and/or the loose collar itself may snag or get hooked onto something thereby trapping and/or injuring the animal or causing the animal to hurt or injure itself trying to free itself.

Thus, what is needed in the art is a collar that can be used as a training collar but also adjusted or "reconfigured" to reduce the chance of or prevent the animal from becoming entrapped and/or injured.

SUMMARY OF THE INVENTION

The present invention solves the above described problems by providing a collar that functions as a training collar by providing an even pressure around an animal's neck when it is configured in "training" mode and by providing, with the same collar, a safe non-adjustable collar. Herein, the "training" mode is also referred to as the "cinching" mode. "Cinch" or "Cinching" is defined herein as providing for or generating an even, essentially even or substantially even pressure around an animal's neck. "Essentially even" or "substantially even" is defined herein as meaning applying pressure to at least 50%, 60%, 70%, 80%, 90%, 95% or more of the circumference of the animal's neck with the collar of the present invention when the collar is cinching the animal's neck. The collar of the present invention provides this pressure by shortening about 1-2 inches when cinched. The circumference reduction of the collar, depending on the size of the collar, would be approximately 10-30%.

The present invention provides for these two modes by having a securing device that permits the collar to be changed from a training/cinching collar to a non-training collar/non-cinching collar. In one configuration, the securing device is positioned to allow the even tightening of the collar around the animal's neck, thereby making it suitable for training purposes. In the other configuration, the securing device is positioned to prevent the collar from being loose or from inadvertent tightening. This mode is referred to herein as the non-cinching mode. The "non-cinching mode" greatly reduces or eliminates the possibility of the collar cinching and may also be referred to herein as the "reduced cinching mode."

Thus, the unique collar design of the present invention cinches to provide gentle control and security yet can be repositioned for off leash use so there's no need to swap to an everyday collar for identification purposes at the dog park, traveling, or even at doggy daycare. The collar of the present invention provides for gentle control to help distract pulling and prevents an animal from backing out of the collar when in the cinching mode and provides safety for the animal when in the non-cinching mode.

Thus, in one embodiment an animal collar is contemplated where the collar comprises: i) a strap with a first end and a second end, ii) a reversibly connectable buckle having a first element and a second element, iii) a ring, iv) a length adjustment mechanism and v) a positionable securing device for securing the collar in a cinching mode or a reduced cinching/non-cinching mode; wherein, the first end of the strap is passed through the ring; folded back on itself passed through the first element of the buckle and is attached to a first area on the strap, thereby creating a first loop on the first end of the strap that passes through the ring and first element of the buckle; wherein, the second end of the strap, passes through the length adjustment mechanism, passes through the second element of the buckle is folded back on itself and is attached to the length adjustment mechanism, thereby creating a second loop on the second end of the strap that passes through the length adjustment mechanism and the second element of the buckle; and, wherein, said securing device is positionable in i) the cinching mode with the securing device in a first position on the first loop between the ring and first element of the buckle allowing the first element of the buckle to slide in the first loop, thereby allowing for cinching or ii) positionable in the reduced cinching/non-cinching mode with the securing device in a second position on the first loop between the first element of the buckle and the first area, thereby significantly reducing the distance the buckle slides in the first loop or preventing the buckle from sliding in the first loop and significantly reducing cinching or preventing cinching.

In another embodiment of the present invention, it is contemplated that the animal collar of the present invention may be integrated with or into a harness.

In another embodiment of the present invention, it is contemplated that the ring is an O-ring, D-ring or a rectangular ring.

In another embodiment of the present invention, it is contemplated that the securing device is a loop of woven or non-woven fabric and comprises a snap, hook and loop, hook, buckle or clip to remove and then secure the securing device during positioning of the securing device.

In another embodiment of the present invention, it is contemplated that the length adjustment mechanism is adjusted manually.

In another embodiment of the present invention, it is contemplated that the length adjustment mechanism is a slider mechanism or slide buckle.

In another embodiment of the present invention, it is contemplated that the buckle is a quick release buckle or a side release buckle.

In another embodiment of the present invention, it is contemplated that when worn by an animal, the collar will cinch the animal's neck if the securing device is in the first position and the animal pulls on a lead attached to the collar or the lead is pulled.

In another embodiment of the present invention, it is contemplated that when worn by an animal, the collar with not cinch the animal's neck if the securing device is in the second position and the animal pulls on a lead attached to the collar.

The present invention still further contemplates a method of retaining an animal on a lead, the method comprising: in either order, placing the collar of the present invention around the neck of an animal to be retained and adjusting the length of the collar with the adjustment device so that the collar is tight enough to not slide over the animal's head; positioning the securing device in the cinching mode; attaching a lead to the ring on the collar; wherein, when the animal pulls on the lead or the lead is pulled the collar cinches the animal's neck.

The present invention still further contemplates the method comprises that when the animal is off the lead, positioning the securing device in the reduced cinching/non-cinching mode to reduce the chance of the collar from cinching or prevent the collar from cinching.

BRIEF DESCRIPTION OF THE FIGURES

FIGS. 7 A & B show (A) the collar of the present invention when the lead is not pulled—the collar is "relaxed;" (B) shows the collar of the present invention when the lead is pulled or the animal pulls against the lead causing the collar to tighten (i.e., cinched).

DETAILED DESCRIPTION OF THE INVENTION

The collar of the present invention is not limited by the material it Is made from. One of skill in the art is familiar with materials suitable for use in collars. However, we list several preferred materials for use in the collar of the present invention here. The collar of the present invention, can be made from woven and non-woven materials. Woven materials may be synthetic fibers such as, but not limited to, nylon and polyester, etc., or natural fibers such, as but not limited to, cotton, wool, etc. Non-woven materials may be, but are not limited to, for example, leather or materials made from synthetic and natural fibers. The securing device may also be made of any of these materials. The collar and/or securing device of the present invention may also be made of any combination of the above materials.

The length of the collar may be from about 8 inches to about 25 Inches or more. The width may be from about 0.4 inches to about 1.5 inches or more. All values in between the stated values are also encompassed by the present invention.

The buckles, rings and length adjustment mechanisms may be made of, for example, plastic or metal. The buckle may be, for example, a quick release and/or side release buckle or other suitable buckling mechanism known to one of skill in the art. The rings may be O-rings, D-rings or rectangular rings or other rings known to one of skill in the art. The length adjustment mechanism may be, for example, a double rectangular ring (e.g., a slide buckle) or other length adjustment mechanism known to one of skill in the art.

The securing device (12 in the figures) may itself be secured with, for example, a snap(s) or with hook and loop fastener, hook, buckle, clip or other means known to one of skill in the art.

Figure 1:
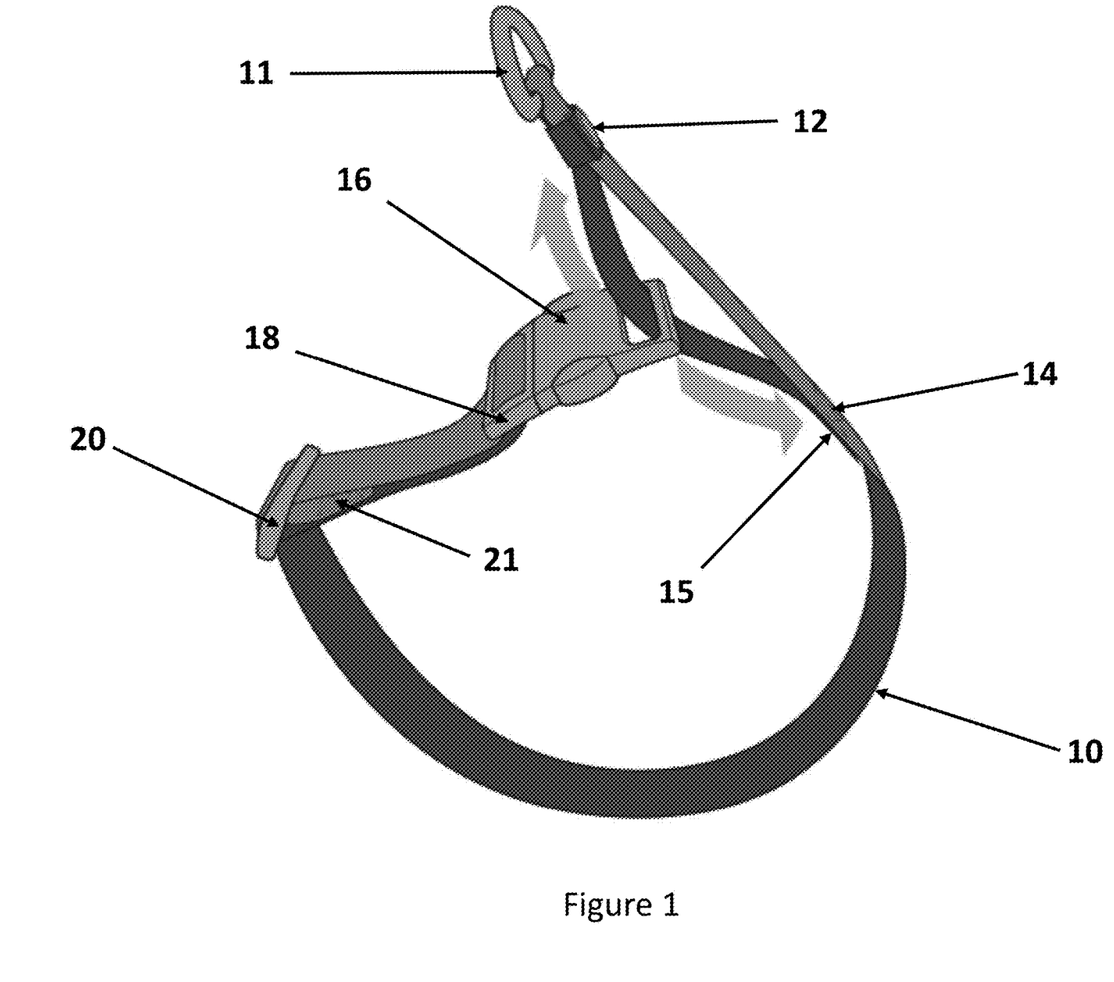
FIG. 1 shows the collar of the present invention in the cinching position.

FIG. 1 shows a representation of the collar of the present invention. The strap 10 has a first end 15 and a second end 21. The first end passes through the ring 11, the first element of the buckle 16 and is attached at the first area 14 on the strap. The second end of the strap 21 passes through the length adjustment mechanism 20, through the second element of the buckle 18 is folded back on itself and attached to the length adjustment mechanism. The ring 11 is where a lease or lead is attached. The securing device 12, used to secure the collar in the cinching mode or reduced cinching/non-cinching mode is movable and removable. In FIG. 1, the securing device 12 is in the position for the cinching mode. The broad arrows indicate the movement of a section of the collar that causes the collar to cinch when the animal pulls or the lead is pulled.

Figure 2:
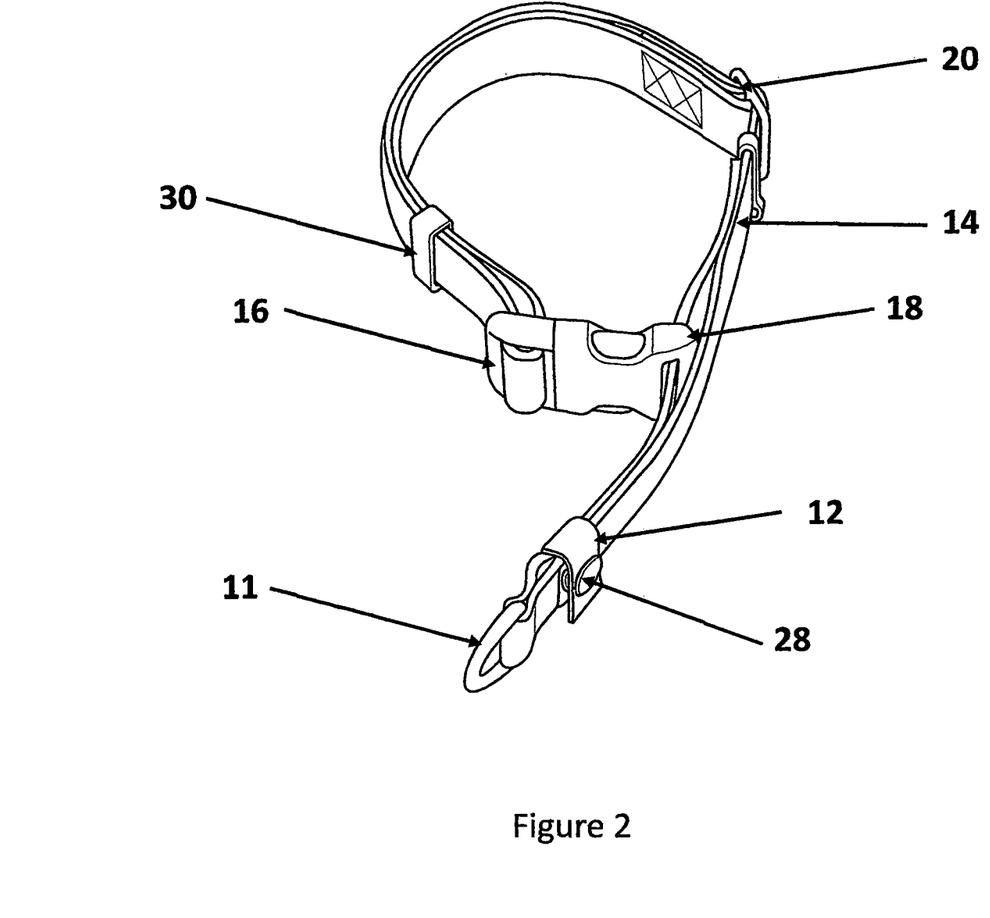
FIG. 2 shows a photograph of the collar of the present invention in the cinching position.

FIG. 2 shows a photograph of the collar of the present invention. Visible in this photograph, in addition to the elements described in the previous paragraph, is the locking element on the securing device, in this embodiment a snap 28. Element 30 is an optional plastic, rectangular loop to help retain the parts of the strap that may be positioned next to each other depending on the required collar length.

Figure 3:
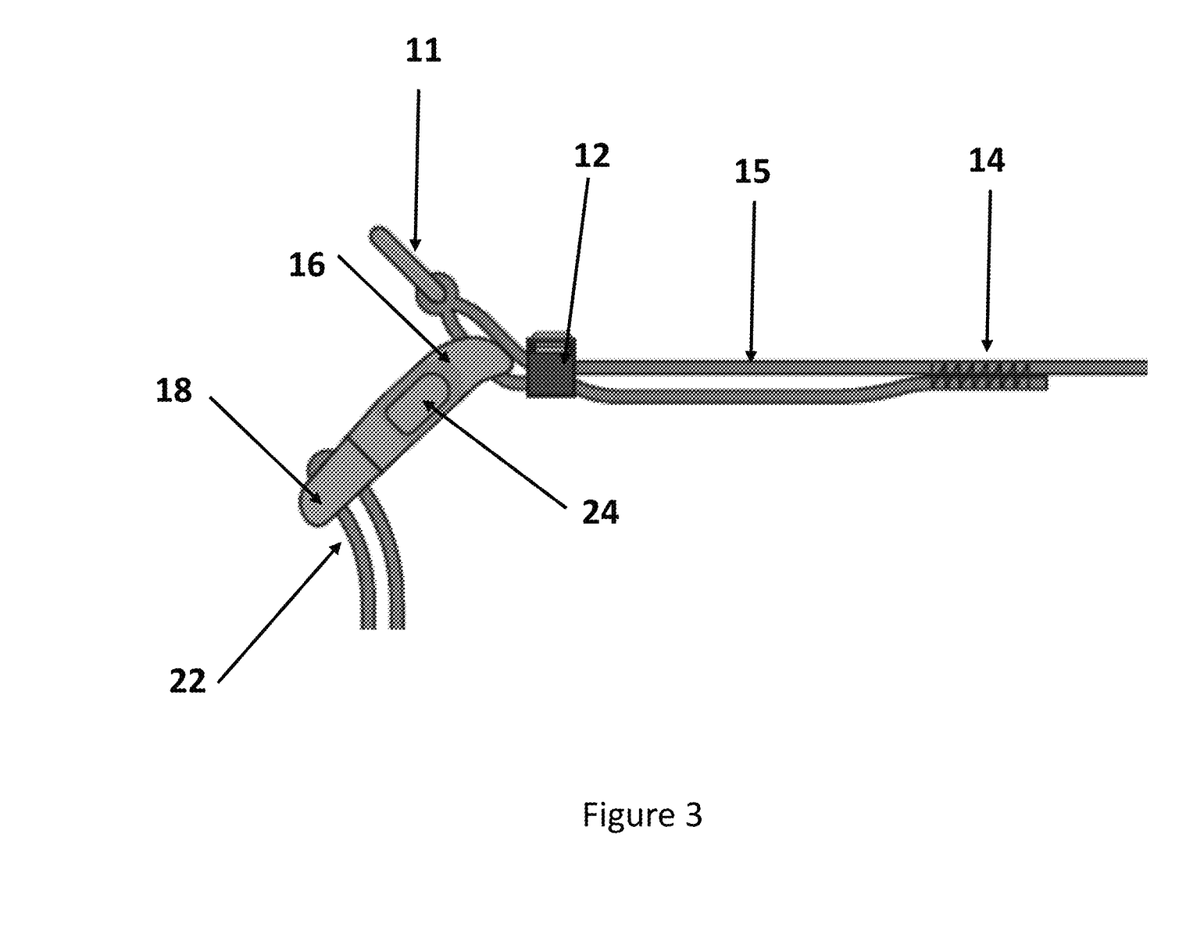
FIG. 3 shows a side view of the collar of the present invention in the non-cinching position.

FIG. 3 shows a close-up view of a portion of the collar with the securing device in the reduced cinching/non-cinching mode. The securing device may be positioned anywhere between the buckle 16/18 and the first position on the strap 14. FIG. 3 also clearly shows the second end of the strap where it is folded back on itself 22 at is passes through the second element of the buckle 18.

Figure 4:
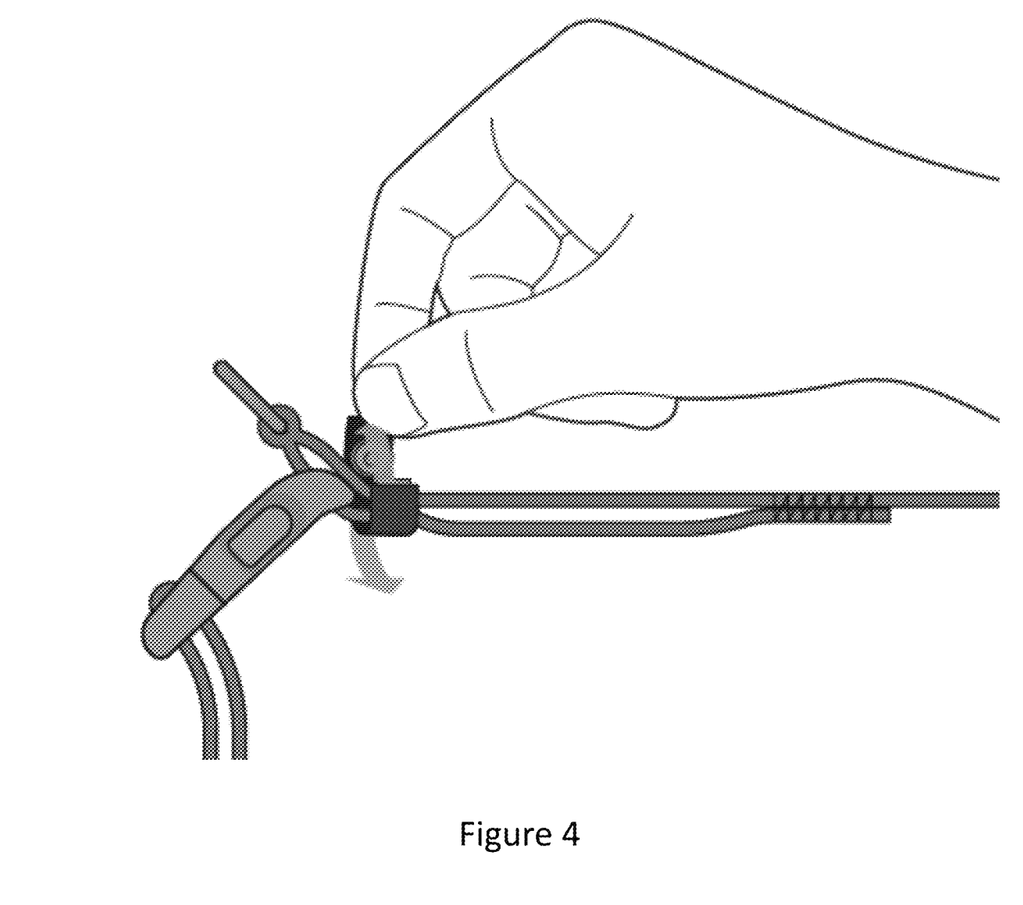
FIG. 4 shows the securing device being unsnapped so it may be moved it to the cinching position.

FIG. 4 shows the securing device being opened so it can be moved from the reduced cinching/non-cinching mode to the cinching mode.

Figure 5:
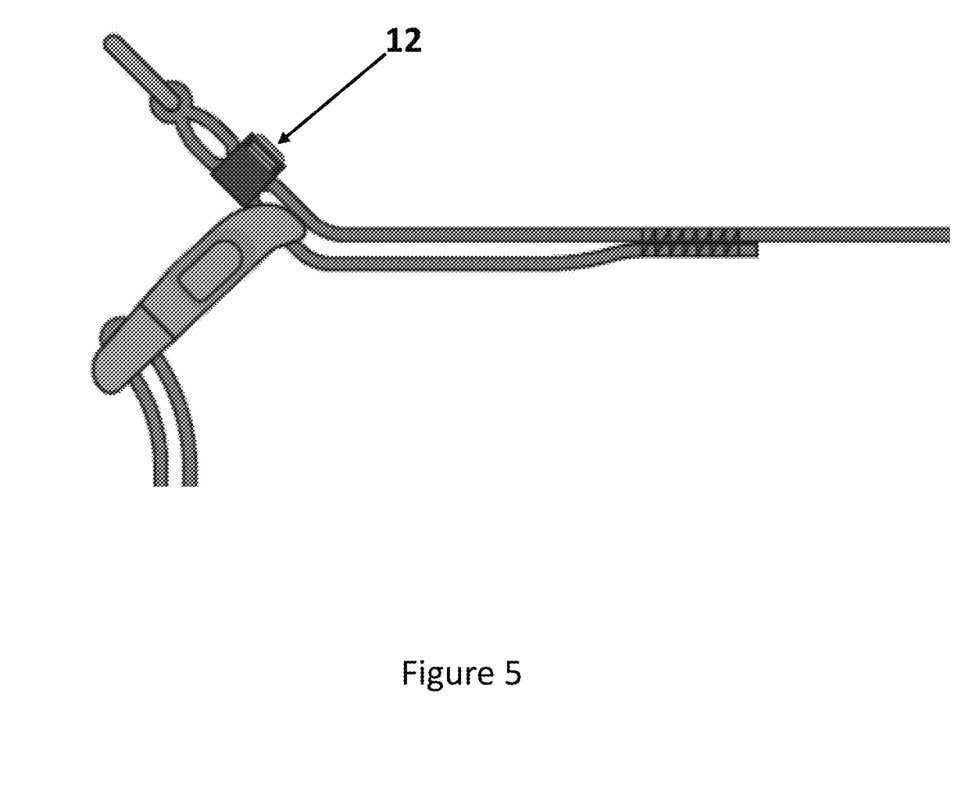
FIG. 5 shows a side view of the collar of the present invention with the securing device in the cinching position.

FIG. 5 shows the securing device repositioned in the cinching mode.

Figure 6:
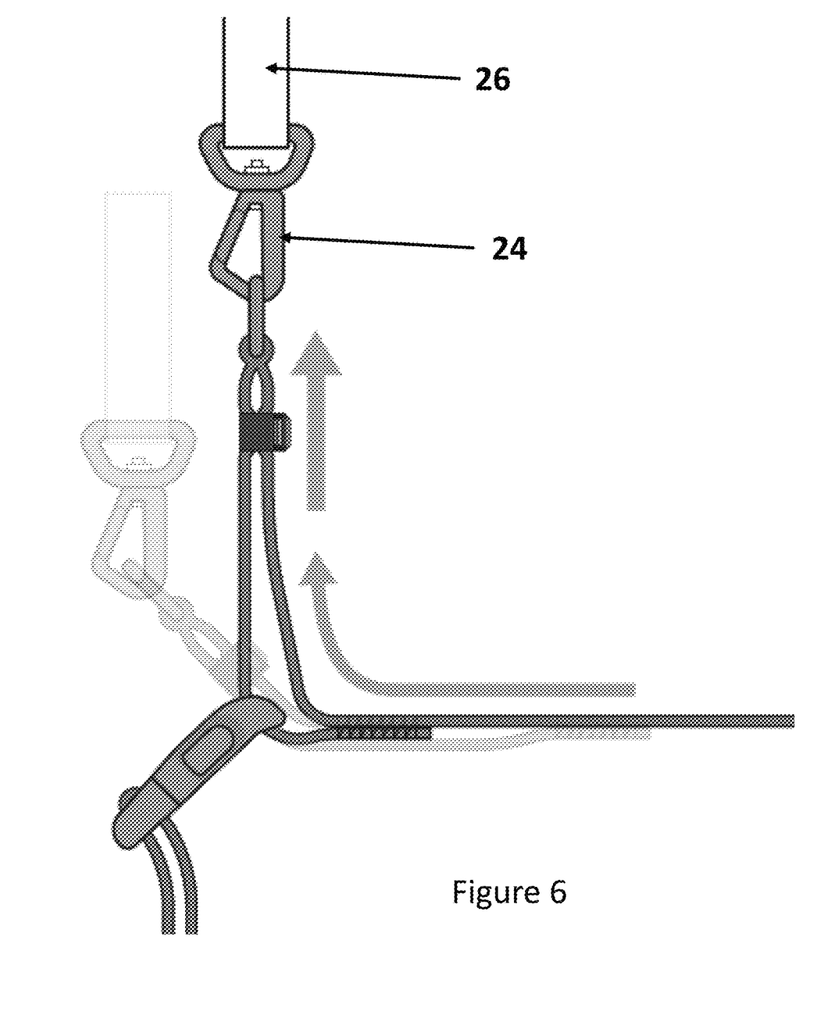
FIG. 6 shows, in the dark lined representation, how the collar is reduced in circumference when the lead is pulled or the animal pulls against the lead. The light lined representation shows the collar when the lead is not pulled.

FIG. 6 shows the collar in the cinching mode. The lead is shown 26 as is the snap buckle on the lead 24. The thick arrow show the movement of the collar when the animal pulls of the lead is pulled. The lighter image to the left of the main image shows the position of the collar when the animal or lead is not pulling.

Figure 7:
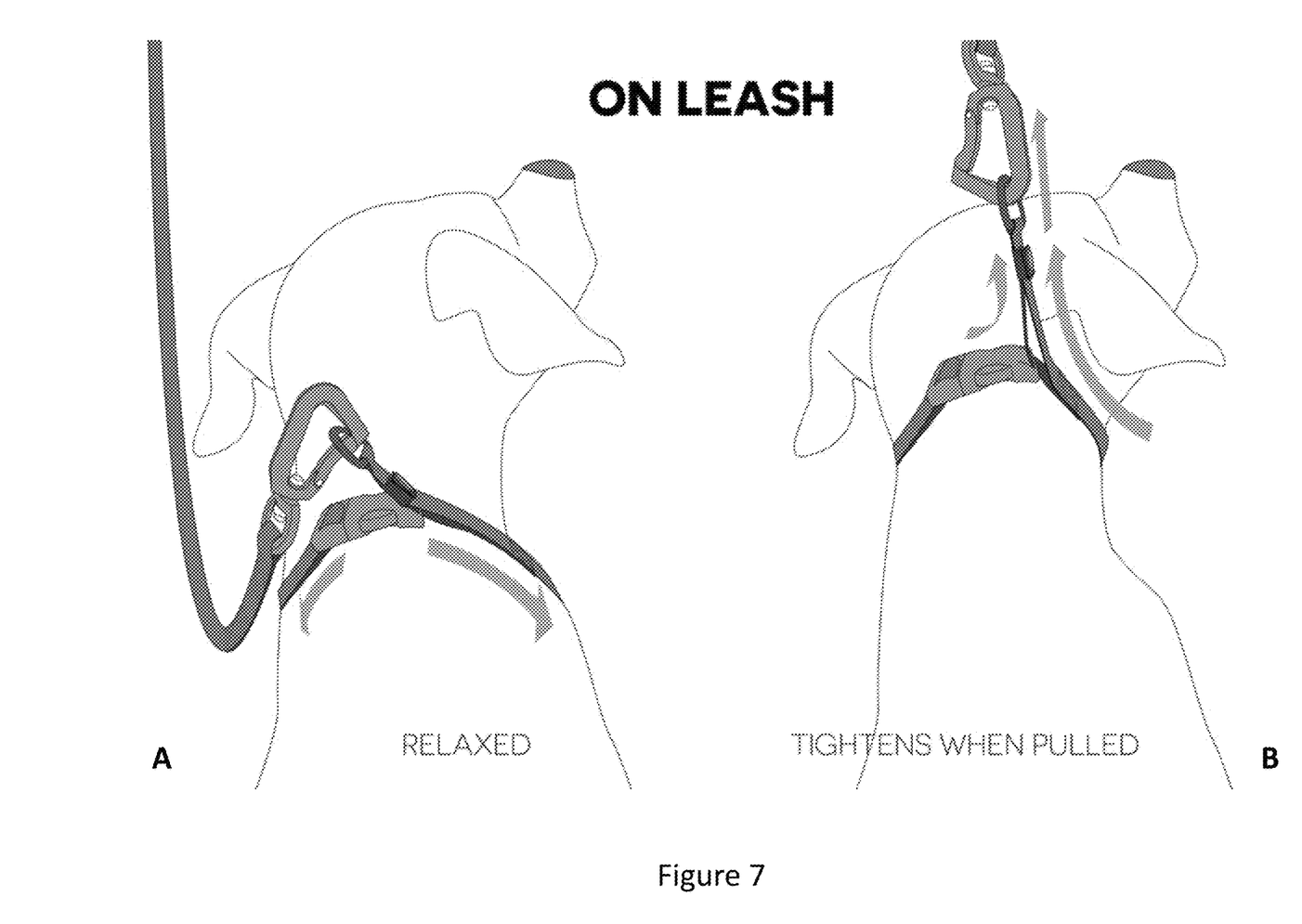

FIG. 7 gives another view of the collar when in use. FIG. 7A shows the collar in the cinching mode and the lead and collar relaxed and, therefore, not cinching the animal. FIG. 7B shows how the collar tightens or cinches when the animal pulls or lead is pulled.

Figure 8:
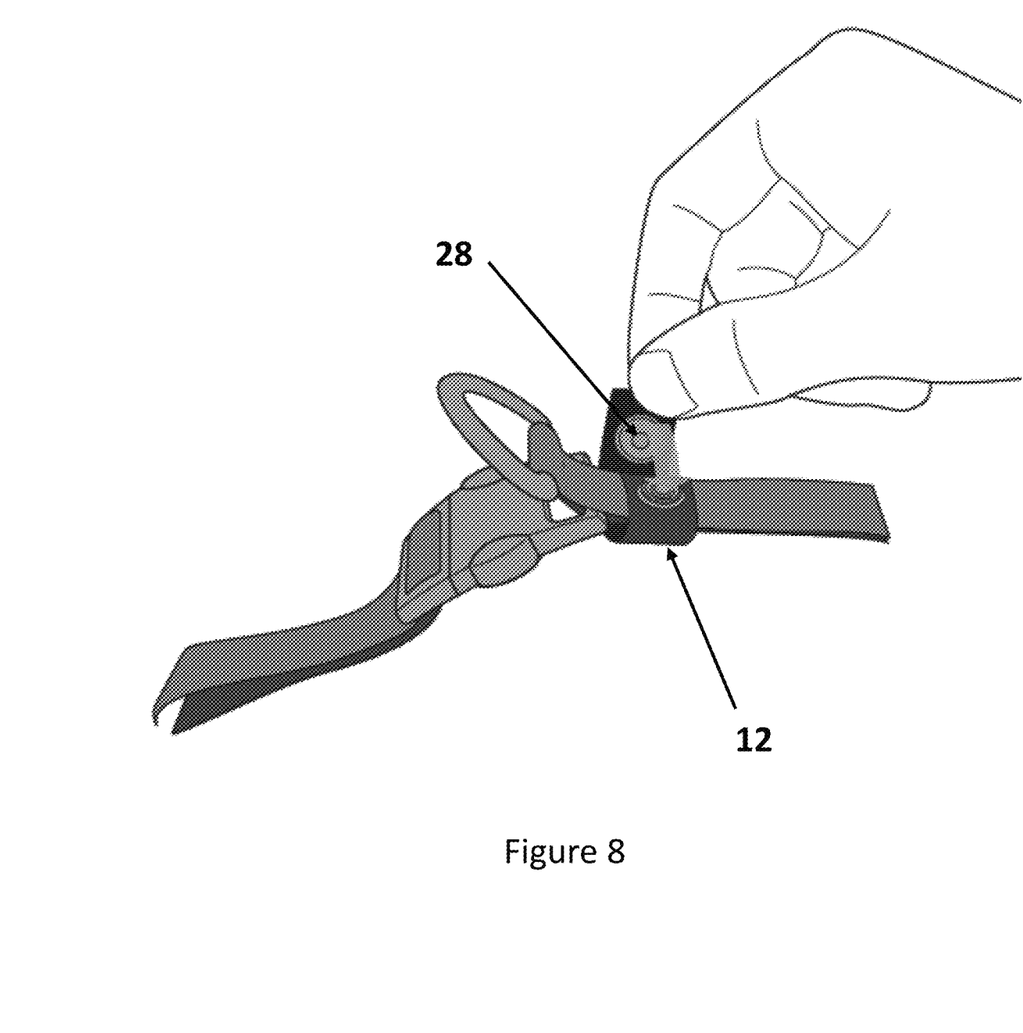
FIG. 8 shows the securing device being secured to put the collar in the non-cinching position.

FIG. 8 shows the securing device being positioned in the reduced cinching/non-cinching mode.

Figure 9:
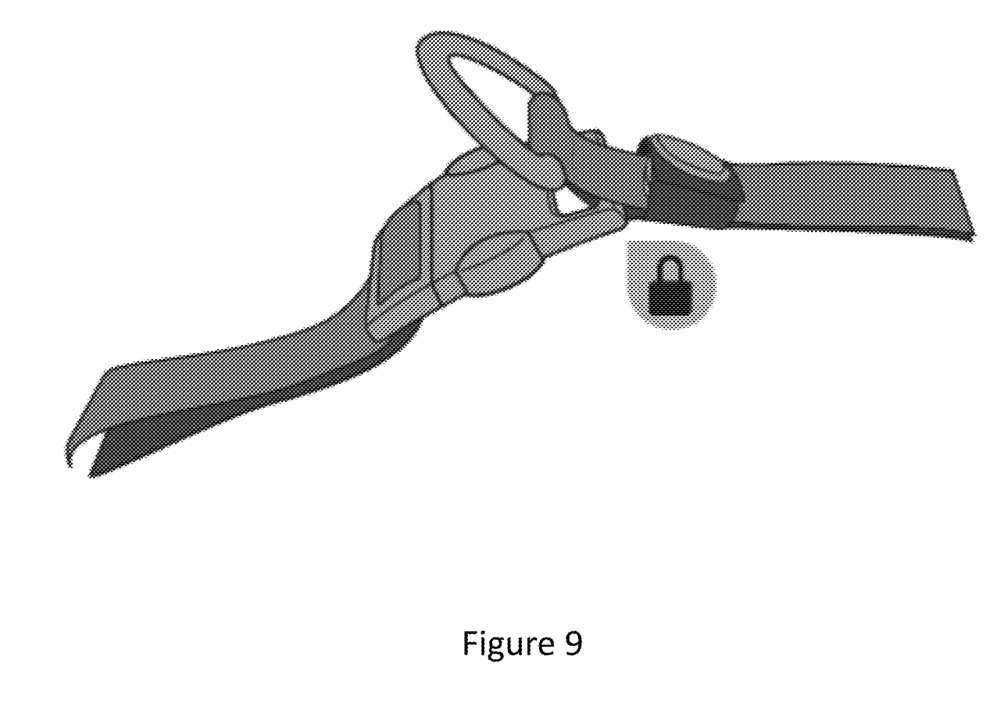
FIG. 9 shows the collar of the present invention in the non-cinching (i.e., relaxed) position.

FIG. 9 shows the securing device locked thereby placing the collar in the reduced cinching/non-cinching mode.

We claim:

1. An animal collar, said collar comprising:
 a) providing: i) a strap with a first end and a second end,
  ii) a reversibly connectable buckle having a first element and a second element, iii) a ring, iv) a length adjustment mechanism and v) a positionable securing device for securing the collar in a cinching mode or a reduced cinching/non-cinching mode;

b) wherein, the first end of the strap is 1) passed through the ring; 2) folded back on itself 3) passed through the first element of the buckle and 4) is attached to a first area on the strap, thereby creating a first loop on the first end of the strap that passes over the first element of the buckle, through the ring and through the first element of the buckle and, wherein the ring is positioned at the end of the first loop;

c) wherein, the second end of the strap 1) passes through the length adjustment mechanism 2) passes through the second element of the buckle 3) is folded back on itself and 4) is attached to the length adjustment mechanism, thereby creating a second loop on the second end of the strap that passes through the length adjustment mechanism and the second element of the buckle; and d) wherein, said securing device is positionable 1) in the cinching mode with the securing device in a first position on the first loop between the ring and first element of the buckle allowing the first element of the buckle to slide in the first loop, thereby allowing for cinching or 2) in the reduced cinching/non-cinching mode with the securing device in a second position on the first loop between the first element of the buckle and the first area, thereby significantly reducing the distance the buckle slides in the first loop or preventing the buckle from sliding in the first loop and significantly reducing cinching or preventing cinching.

2. The animal collar of claim 1, wherein said animal collar is integrated with a harness.

3. The animal collar of claim 1, wherein said ring is an O-ring or a D-ring.

4. The animal collar of claim 1, wherein said securing device comprises a snap, hook and loop, hook, buckle, or clip, to remove and then secure the securing device during positioning.

5. The animal collar of claim 1, wherein, said length adjustment mechanism is adjusted manually.

6. The animal collar of claim 1, wherein, said length adjustment mechanism is a slider mechanism or slide buckle.

7. The animal collar of claim 1, wherein said buckle is a quick release buckle or a side release buckle.

8. The animal collar of claim 1, wherein when worn by an animal, the collar will cinch the animal's neck if the securing device is in the first position and the animal pulls on a lead attached to the collar.

9. The animal collar of claim 1, wherein when worn by an animal, the collar with not cinch the animal's neck if the securing device is in the second position and the animal pulls on a lead attached to the collar.

10. The animal collar of claim 1, wherein said ring is securely positioned at the end of the first loop.

11. A method of retaining an animal on a lead, the method comprising:
a) in either order, placing the collar of claim 1 around the neck of an animal to be retained and adjusting the length of the collar with the adjustment device so that the collar is tight enough to not slide over the animal's head;
b) positioning the securing device in the cinching mode;
c) attaching a lead to the ring on the collar;
d) wherein, when the animal pulls on the lead or the lead is pulled the collar cinches the animal's neck.

12. The method of claim 11, further comprising: when the animal is off the lead, positioning the securing device in the reduced cinching/non-cinching mode to reduce the chance of the collar from cinching or prevent the collar from cinching.

* * * * *